United States Patent
Harju et al.

(10) Patent No.: US 8,788,599 B2
(45) Date of Patent: Jul. 22, 2014

(54) MESSAGE DELIVERY MECHANISM

(75) Inventors: Teemu Harju, Espoo (FI); Matti I. Vesterinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 543 days.

(21) Appl. No.: 12/992,272

(22) PCT Filed: May 13, 2009

(86) PCT No.: PCT/EP2009/055749
§ 371 (c)(1),
(2), (4) Date: Nov. 29, 2010

(87) PCT Pub. No.: WO2009/138417
PCT Pub. Date: Nov. 19, 2009

(65) Prior Publication Data
US 2011/0072099 A1 Mar. 24, 2011

(30) Foreign Application Priority Data
May 14, 2008 (EP) .................................. 08156129

(51) Int. Cl.
*G06F 15/16* (2006.01)
*G06F 15/173* (2006.01)
*H04L 12/58* (2006.01)

(52) U.S. Cl.
CPC ......... *H04L 12/5875* (2013.01); *H04L 12/5895* (2013.01); *H04L 51/30* (2013.01); *H04L 12/5835* (2013.01); *H04L 51/066* (2013.01); *H04L 12/5855* (2013.01)
USPC ............................. 709/206; 709/238; 709/246

(58) Field of Classification Search
USPC ........................................................ 709/206
See application file for complete search history.

(56) References Cited

U.S. PATENT DOCUMENTS

| | | | | |
|---|---|---|---|---|
| 5,596,720 | A | * | 1/1997 | Hamada et al. ............... 709/206 |
| 6,882,843 | B1 | * | 4/2005 | Comer .......................... 455/445 |
| 2003/0217178 | A1 | * | 11/2003 | Yoshimura et al. ........... 709/239 |
| 2004/0019695 | A1 | * | 1/2004 | Fellenstein et al. ........... 709/239 |

FOREIGN PATENT DOCUMENTS

| | | |
|---|---|---|
| CN | 1620019 A | 5/2005 |
| CN | 1635503 A | 7/2005 |
| CN | 101094436 A | 12/2007 |
| GB | 2435981 | 9/2007 |
| WO | 2005/048617 | 5/2005 |

OTHER PUBLICATIONS

Open Mobile Allience (OMA) Converged IP Messaging Requirements (Canditate Version 1.0—Nov. 6, 2007), 2007 open Mobile Alliance Ltd.*
Open Mobile Alliance (OMA), Nov. 6, 2000, version 1-0,.*
Open Mobile Alliance (OMA), Converted IP Messaging Requirements Candidate Version 1.0—Nov. 6, 2007, a total of 71 pages.
Office Action dated Feb. 5, 2013 issued in corresponding CN Application No. 200980127432.6.

* cited by examiner

*Primary Examiner* — Faruk Hamza
*Assistant Examiner* — Abu-Sayeed Haque
(74) *Attorney, Agent, or Firm* — Squire Patton Boggs (US) LLP

(57) ABSTRACT

When a messaging service network entity, such as an IP server, fails to deliver the message via a primary messaging service, such as an Internet Protocol based messaging service, the user device sends the message directly to the recipient user via a backup messaging service, such as a short message service, SMS. Thus message is delivered and the originating user bear the cost of the use of the backup messaging service.

16 Claims, 5 Drawing Sheets

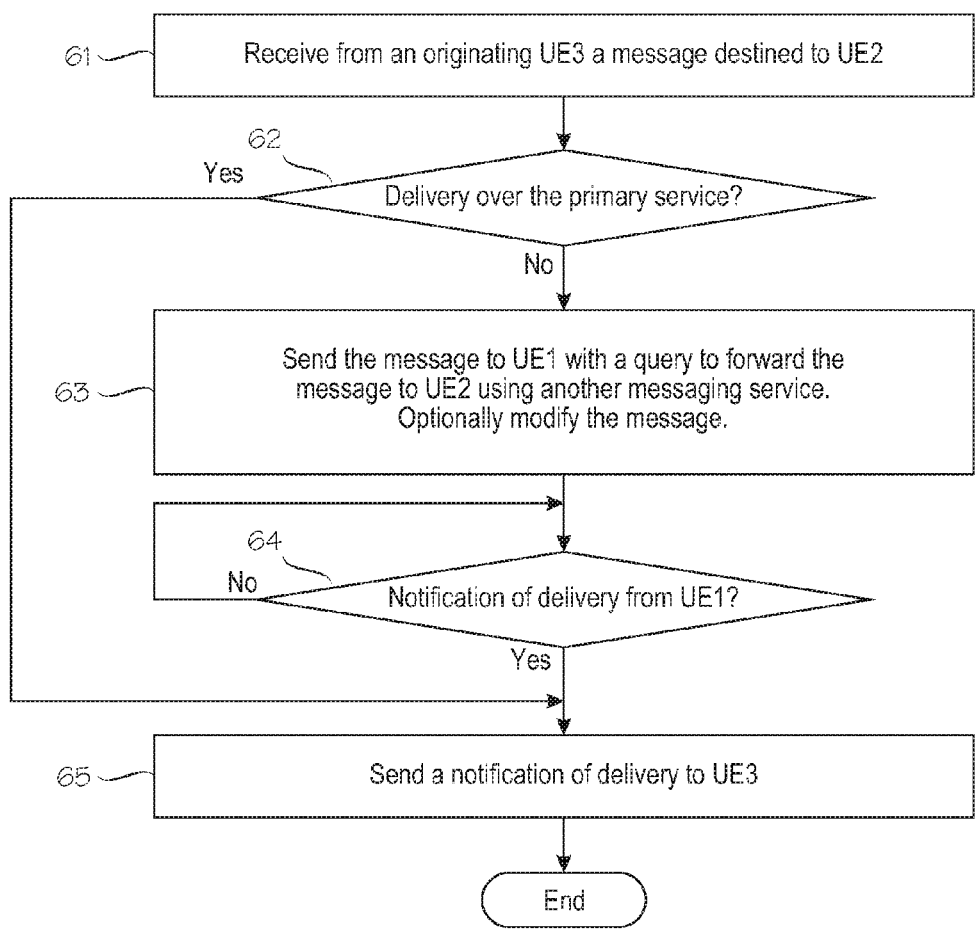

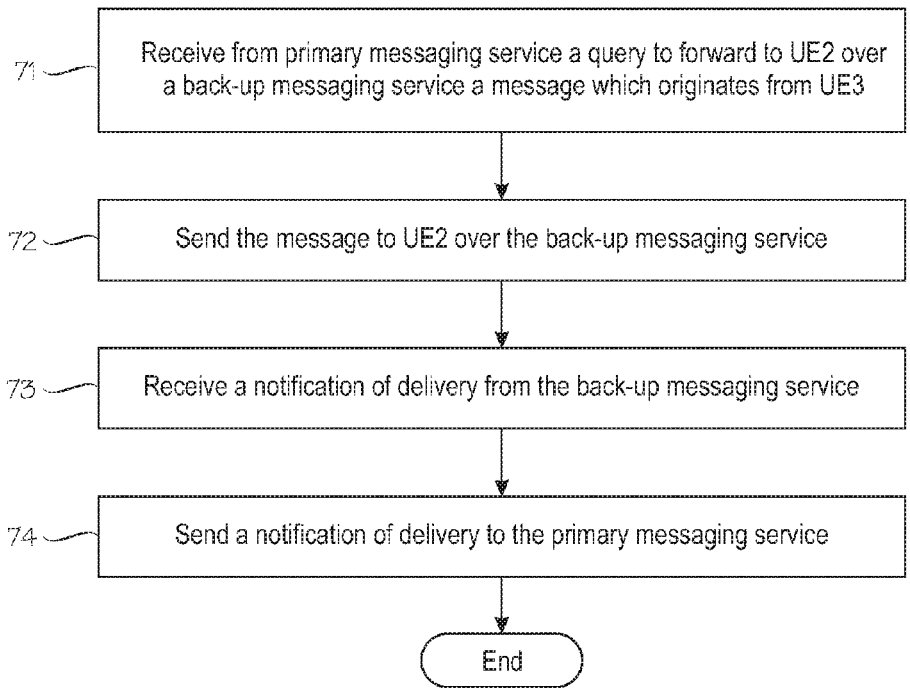
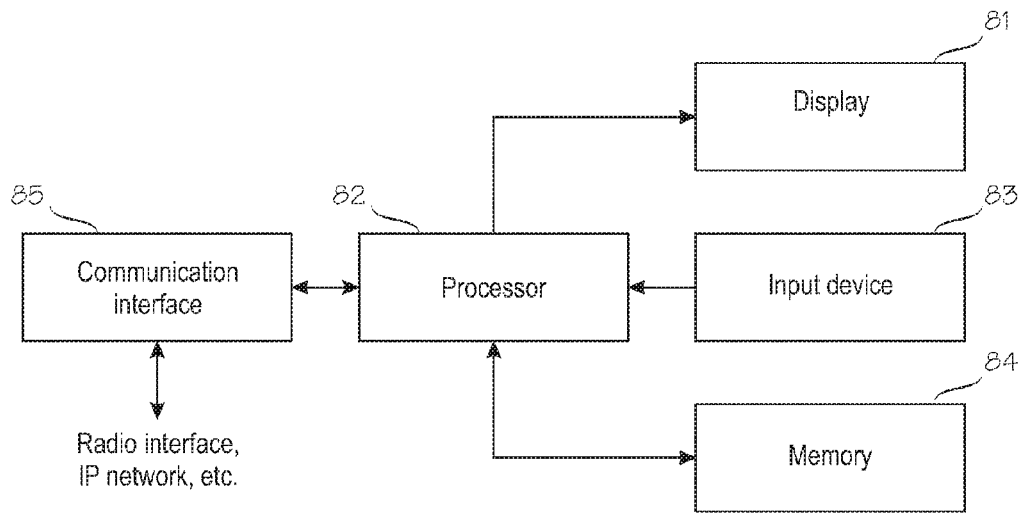

MESSAGE DELIVERY MECHANISM

FIELD OF THE INVENTION

The present invention relates to messaging services, and particularly to securing the delivery of messages.

BACKGROUND OF THE INVENTION

Messaging generally refers to a set of features that let the user create, store, send, receive, and manage different types of messages or discrete media between two or more users. Messaging may be based on store and forward, store and retrieve, store and push functions, or peer-to-peer messaging (P2P). Examples of messaging services include discrete media (e.g. text messages) between two or more users, such as Short Message Service (SMS), Multimedia Messaging Service (MMS), email, IMPS (Instant Messaging and Presence Service), Extensible Messaging and Presence Protocol (XMPP), peer-to-peer messaging (P2P), Simple/IM (SIP for Instant Messaging and Presence Leveraging Extensions/Instant Messaging), Voice over IP calls, PoC (Push-to-talk over Cellular).

Messaging services may employ a variety of communication technologies and access networks. Many of the new messaging services employ internet protocol (IP) based technologies, or more particularly Session Initiation Protocol (SIP) or Extensible Messaging and Presence Protocol (XMPP) based technologies. SIP and XMPP are IETF (Internet Engineering Task Force) application-layer protocols. SIP is a control (signaling) protocol for creating, modifying, and terminating sessions with one or more participants. XMPP is an XML technology for presence and real-time communication.

IP Multimedia Subsystem (IMS) is a 3rd Generation Partnership Project (3GPP) standardised network architecture that provides an access network independent standardised interface for creating services, charging mechanisms and better Quality of Service (QoS) than best effort. Examples of the services that are implemented on IMS at the moment are PSTN functionality, Push-to-talk over cellular (PoC), Presence, Instant messaging and video sharing. A Converged IP Messaging (CPM) workgroup inside the Open Mobile Alliance, OMA, aims to remove the silos between traditional messaging services caused by technical differences, and provide users with a smooth, unified service experience. These aims are defined in the document "Converged IP Messaging Requirements, Candidate Version 1.0", 6 Nov. 2007 (OMA-RD-CPM-V1_0-20071106-C).

Individual user devices may support a plurality of different messaging services. The user may choose a messaging service for sending a message based on any suitable criterion, such as the price of the message delivery, availability of the recipient, etc. Usually the aim is to deliver the message through the most suitable messaging service without worrying sender of the used messaging service, while the delivery is guaranteed. The messaging application may use the least-cost (cheapest) messaging service that seem to be available (usually the availability is based on the presence information of the recipient) and if the least-cost messaging service is not available, the messaging application may automatically use or propose to use an alternative messaging service. Information on the availability of the recipient user may be obtained from a presence service. The presence service allows mobile phone users to publish their current presence information and retrieve the presence information of other users of the service. Presence information includes, for example, the user's availability, location, and communication preferences. In the presence-based systems it may happen that the presence information is not always up-to-date; consequently, the user may try to use a messaging service that is not actually available.

The message from the sending user device is typically routed to a messaging system element, such as a server or a service center, to be delivered to the recipient user. The messaging system element may deliver the message to the recipient using the same messaging service as the sender, or using another messaging service, based on a suitable criterion, such as the preference of the recipient user. If the recipient is not available and the message cannot be delivered, the store and forward function of the messaging system element may store the message until the recipient again becomes available (online) for the selected messaging service and the message can be delivered. This procedure is referred to as an offline message delivery herein. The messaging system element may also notify the sender about the offline message delivery. Selecting an alternative messaging service at the messaging system element as an alternative channel for delivery of the message which cannot be delivered through the original messaging service (channel), is problematic because the service provider should not have to bear the cost of the message delivery on behalf of the user. For a mobile operator the delivery cost is not a problem since they run the access network and administrate the billing, but for other service providers, such as Internet service providers, the delivery cost can be huge, for example in case of SMS.

BRIEF DESCRIPTION OF THE INVENTION

An object of the present invention is to provide an enhanced mechanism for delivering messages. The object of the invention is achieved by means of methods, a network element, a communication device and programs as claimed in the independent claims. The preferred embodiments of the invention are disclosed in the dependent claims.

According to an aspect of the invention, when a user device attempts to send a message destined to a recipient user via a first messaging service, but receives from a messaging system a notification of failure to deliver the message to the recipient user device, or optionally when the first messaging service is not reachable by the user device, the user device sends the message to the recipient user via an alternative messaging service that is referred to as a backup messaging service. In an embodiment of the invention, the user device optionally sends to the messaging system a notification of delivery of the message via said backup messaging service. In an embodiment of the invention, the first, primary messaging service may comprise a least-cost messaging service. In an embodiment of the invention, the user device may select the backup messaging service and a backup address based on user contact information stored in the user device, such as in a phone book or contact book application which enables to map recipient's different addresses for different messaging services. In an embodiment of the invention, the first, primary messaging service comprises an Internet Protocol based messaging service, and the other, backup messaging service comprises a text message service (such as a short message service, SMS) or a multimedia messaging service (e.g. MMS) over mobile communication media. This aspect of the invention may be employed, for example, when a messaging service network entity, such as an IP server, fails to deliver the message via the primary messaging service, and it may be impossible or expensive for the messaging service network entity to send the message directly to the recipient user device via another, backup messaging service. When the originating user device sends the message via the backup messaging service, the message gets delivered and the originating user bear the cost of the use of the backup messaging service.

According to another aspect of the invention, when a user device receives from a messaging system via a first messaging service a message destined to another recipient user device, the user device sends (i.e. forwards or relays) the received message to the recipient user device via another, backup messaging service. In an embodiment of the invention, the user device optionally sends to the messaging system a notification of delivery of the message via said backup messaging service. In an embodiment of the invention, the first, primary messaging service may comprise a least-cost messaging service. In an embodiment of the invention, the user device may select the backup messaging service and a backup address based on user contact information stored in the user device, such as in a phone book or contact book application which enables to map recipient's different addresses for different messaging services. In an embodiment of the invention, the first, primary messaging service comprises an Internet Protocol based messaging service, and the other, backup messaging service comprises a text message service (such as a short message service, SMS) or a multimedia messaging service (e.g. MMS) over mobile communication media.

According to a further aspect of the invention, when a messaging service element, such as a server entity, receives from an originating user device a message destined to a recipient user device via a first messaging service, it may send to the originating user device a notification, if it fails to deliver the message to the recipient user device. The messaging service element also preferably stores the message until receiving from the originating user device a notification that the latter has delivered the message directly to the recipient user device via a backup messaging service, or until the messaging service element itself succeeds to deliver the stored message. In an embodiment of the invention, the first, primary messaging service may comprise a least-cost messaging service. In an embodiment of the invention, the first, primary messaging service comprises an Internet Protocol based messaging service, and the other, backup messaging service comprises a text message service (such as a short message service, SMS) or a multimedia messaging service (e.g. MMS) over mobile communication media.

According to a still further aspect of the invention, when a messaging service element, such as a server entity, receives from an originating user device a message destined to a recipient user device via a first messaging service, it may send the message (instead of the recipient user device) first to a third user device via the first messaging service, to be delivered (i.e. forwarded or relayed) by the third user device to the recipient user device via a backup messaging service. In an embodiment of the invention, the first, primary messaging service may comprise a least-cost messaging service. In an embodiment of the invention, the first, primary messaging service comprises an Internet Protocol based messaging service, and the other, backup messaging service comprises a text message service (such as a short message service, SMS) or a multimedia messaging service (e.g. MMS) over mobile communication media. This aspect of the invention may be employed, for example, when a user device has a messaging service which is not available for the messaging service element, or when the messaging service is less costly via the user device. For example, if the messaging service element is an IP server, it may be impossible or expensive for the server to send SMSs directly to the recipient user device, but it can route the message to the third user device which sends the SMS to the final recipient.

A further aspect of the invention is a user device or like which is configured to perform user device functionality according to any embodiment of the invention.

An aspect of the invention is a network element or like which is configured to perform messaging service element functionality according to any embodiment of the invention. In an embodiment of the invention, the network element is a server entity.

An aspect of the invention is a program containing an executable code configured to perform the functionality according to any embodiment of the invention when executed in a computing device.

An aspect of the invention is a computer-readable storage medium comprising program code configured to perform the functionality according to any embodiment of the invention when executed in a computing device.

BRIEF DESCRIPTION OF THE DRAWINGS

In the following the invention will be described in greater detail by means of exemplary embodiments with reference to the attached drawings, in which

FIG. 6 is a flow diagram illustrating an example of operation of a primary messaging service center according to an embodiment of the invention;

FIG. 7 is a flow diagram illustrating an example of operation of user equipment according to an embodiment of the invention; and FIG. 8 is an exemplary block diagram block diagram of an entity capable of performing operation according to various embodiments of the invention.

EXEMPLARY EMBODIMENTS OF THE INVENTION

Figure 1:
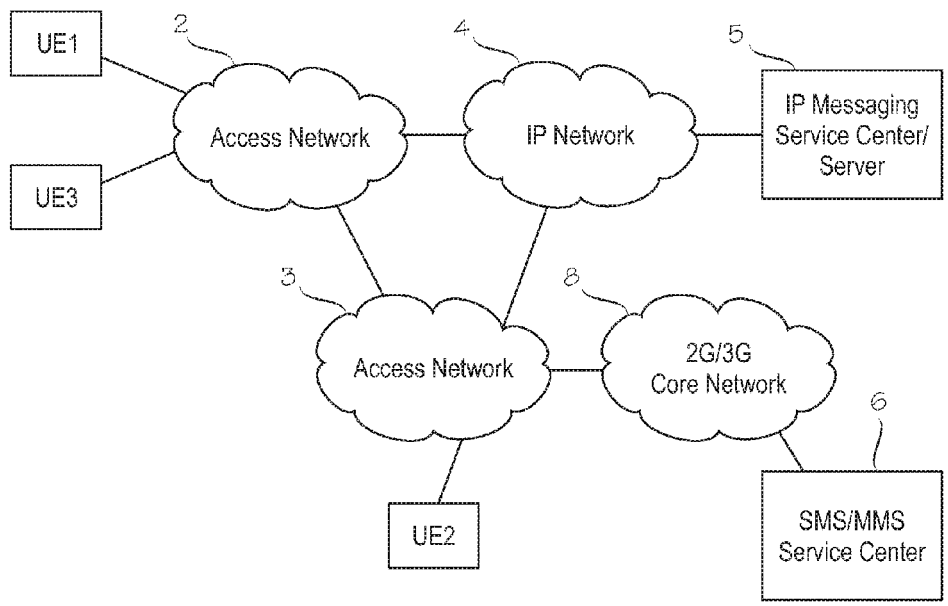
FIG. 1 shows a simplified block diagram illustrating exemplary system architecture wherein the principles of the present invention may be applied.

Referring to the example shown in FIG. 1, user equipments UE1 and UE3 are connected to an access network 2 and UE 2 is connected to an access network 3. The access networks 2 and 3 may be wireless access networks (such as a 2G or 3G mobile communication network or a wireless local area network, WLAN) and the connection may be a wireless link. Alternatively, one or more of the access networks may be a wired access network (such as a local area network, LAN) and the connection may be a wired connection. The access networks 2 and 3 provide for the user equipments UE an access to one or more core networks, such as an Internet Protocol (IP) based network 4, or Internet, and a 2G or 3G core network 8, e.g. GSM (Global System for Mobile communication), GPRS (General Packet Radio Service), WCDMA (Wideband Code Division Multiple Access). In FIG. 1, the IP network 4 represents any suitable packet data communication network environment, particularly IP network environment. Any number of messaging service centers, such as a server, may be connected to the IP network 4 and/or the access networks 2 and 3 to provide messaging services to the user equipments.

Example embodiments of the present invention will be described using Internet Protocol (IP) or Session Initiation Protocol (SIP) based messaging services as an example of the primary messaging service or delivery channel, and Short Message Service (SMS) or Multimedia Messaging Service (MMS) as an example of a secondary, backup messaging service or delivery channel. The invention is, however, not intended to be restricted to any examples described herein but the present invention may be applied to any messaging services which can be used as alternative delivery channels for each other.

The 3rd Generation Partnership Project (3GPP) IP Multimedia Subsystem (IMS) network architecture may be referred to as an example of the core network technologies wherein IP or SIP based messaging services may be provided. Examples of IP or SIP based messaging services include Push-to-talk over cellular (PoC), Instant messaging (IM), IMPS, SIMPLE IM, email, and Mobile email. In unified IP messaging services, such as a Converged IP Messaging (CPM) domain of the Open Mobile Alliance, OMA, many such messages services, even the SMS and MMS, may be commonly supported. A present scenario of a possible architecture and operation of a Converged IP Messaging (CPM) domain is disclosed in the document "Converged IP Messaging Requirements, Candidate Version 1.0", 6 Nov. 2007, OMA-RD-CPM-V1_0-20071106-C), which is incorporated by reference herein. As illustrated in the example of FIG. 1, typical IP messaging services comprise a network entity or function 5, such as a server, a gateway, a service center or a like in IP network environment, while the user equipment comprises a corresponding peer entity or function, such as a client, agent or like. The IP network entity or function 5 may act as a store-and-forward entity where the messages are stored until the message is delivered or until the database storage time expires. In IMS network environment (not shown) may contain a Proxy Call Session Control Function (P-CSCF) and a Serving Call Session Control Function (S-CSCF). The P-CSCF is the UE's first contact point within the IMS. Functions of the P-CSCF include the forwarding of SIP messages received from the UE. These may be sent to the S-CSCF or the Interrogating Call Session Control Function (I-CSCF) depending on the type of message and procedure being carried out.

Examples of non-IP messaging services include the legacy mobile text message and multimedia services. A short message service (SMS) and a multimedia messaging service (MMS) are defined, for example, within the GSM and 3G mobile communication standards and it enables the point-to-point trans-mission of short messages. Short messages and multimedia messages can be sent and received only with user equipment that support the SMS or MMS. Short messages and multimedia messages are sent to a short message service center (SMSC) or a multimedia messaging service center (MMSC), such as an SMS/MMS service center 6 shown in FIG. 1, which acts as a store-and-forward center where the messages are stored until the message is delivered or until the database storage time expires.

Figure 2:
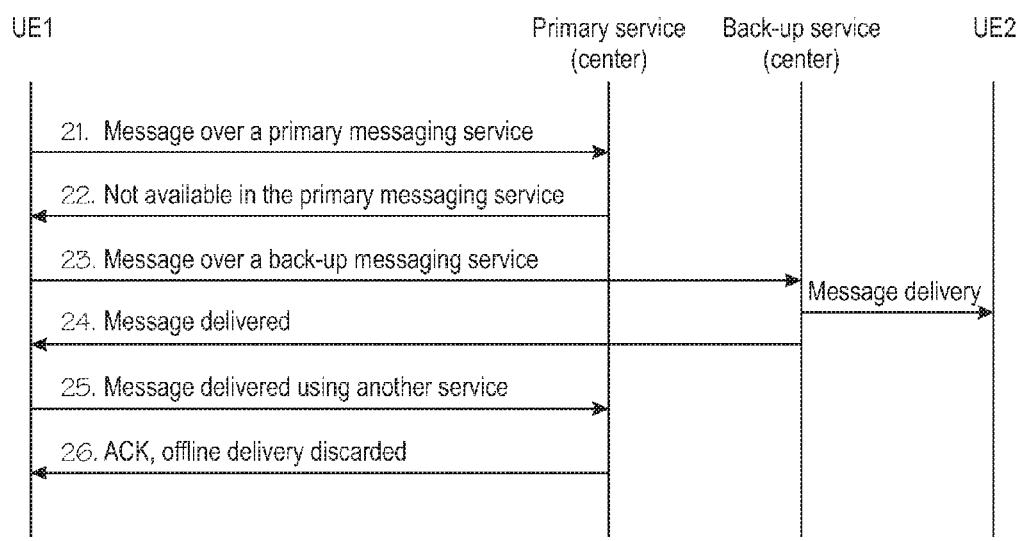
FIG. 2 is a messaging diagram illustrating an exemplary messaging event according to an embodiment of the invention.
Figure 4:
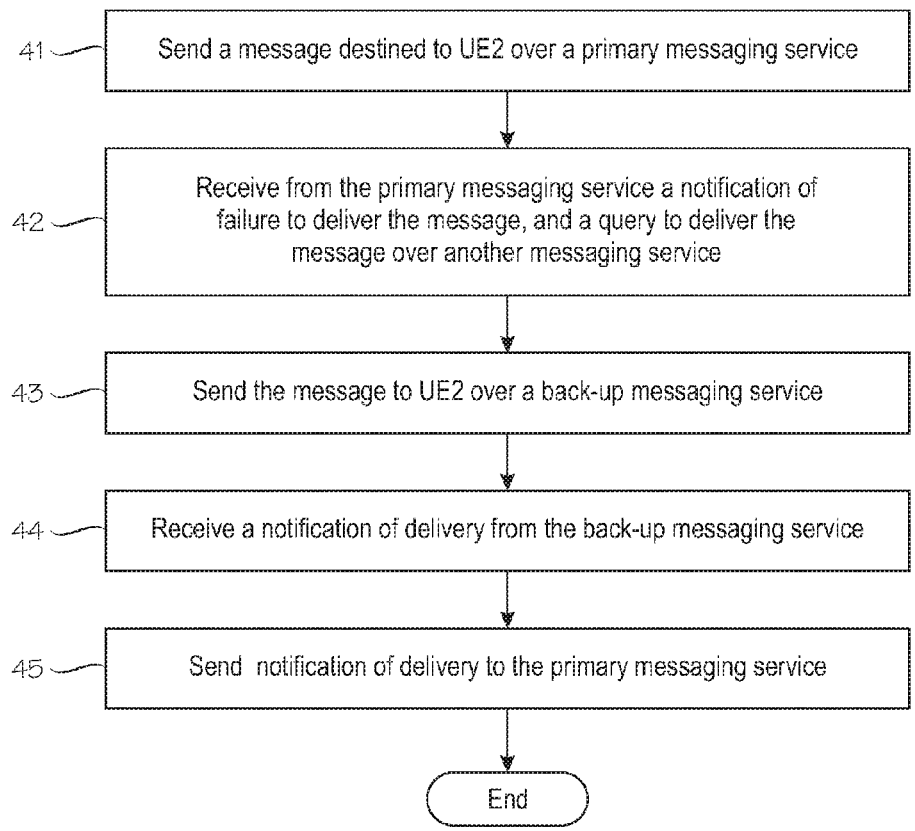
FIG. 4 is a flow diagram illustrating an example of operation of user equipment according to an embodiment of the invention.
Figure 5:
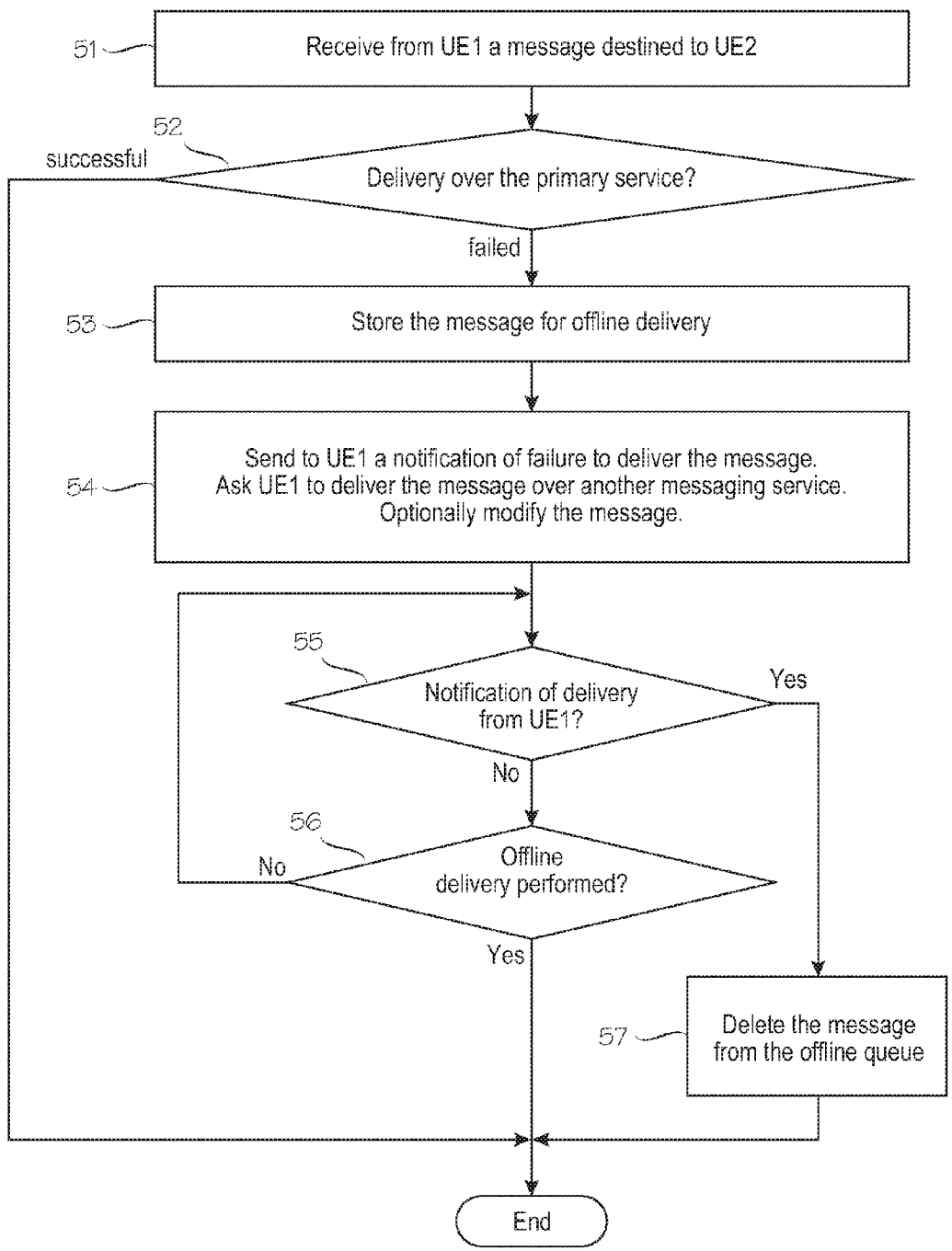
FIG. 5 is a flow diagram illustrating an example of operation of a primary messaging service center according to an embodiment of the invention.

An aspect of the invention is now described by means of an exemplary messaging event with reference to FIGS. 2, 4 and 5. User equipment UE1 of user A is capable of using two or more messaging services, one of them being the preferred or primary service, e.g. because it is the least cost channel to deliver messages. The primary messaging service may be, for example, IP or SIP based messaging service. At least one other messaging service, such as SMS/MMS may be used as a back-up messaging service or channel. UE1 may contain a unified messaging client. The user A may also have a presence service in UE1, allowing the user A to see the presence/availability of predefined group of users on a contact list. The contact list may indicate, for example, that user B having the user equipment UE2 is online/active/available in the primary messaging service. In step 41 in FIG. 4, the user A sends a message 1 to user B over the primary messaging service, e.g. since the user B is online according to the presence service. The message 1 is received at the primary messaging service center (e.g. server) at step 51 in FIG. 5 and the primary service center attempts to deliver the message, step 52. If the delivery is successful, the procedure ends. However, the user B may have just a moment ago dropped from the primary messaging service, although this event has not yet been updated to the user A via the presence service. Thus, the primary messaging service center may fail to deliver the message to the user B, i.e. step 52 results in failure. The primary messaging service center may then store the message to be delivered offline later (step 53), when the user B is again available for the primary service. In step 54, the primary messaging service center may send to the UE1 of the user A a notification of the failure of the delivery 22. The notification 22 may be in form of a query asking the user A to send the message using a back-up messaging service because the user B is not available in the primary messaging service. In response to receiving the notification 22 (step 42), UE1 may send the message 23 over the back-up messaging service (step 43). The message may be received at a back-up messaging service center (e.g. an SMS/MMS service center) and the backup service center successfully delivers the message to the user B. The backup service center may then send an acknowledgement message 24 informing the user A of the successful delivery (step 44). UE1 may then send to the primary service a message 25 indicating that the previously failed message need not be delivered offline, e.g. by indicating that the delivery has been carried out using another messaging service (step 45). Upon receiving the notification 25 (step 55), the primary messaging service center may now delete the stored message from an offline queue, i.e. the offline delivery is discarded (step 57). The primary messaging service center may also send an acknowledgement message 26 informing that the offline delivery is discarded. Alternatively, if a notification of delivery via a backup messaging service is not yet received but the primary messaging service center itself succeeds to deliver the stored message offline, it may end the procedure. It should be appreciated that the steps and messages illustrated above are merely examples. Particularly messages 24, 25, and 26, and steps 44, 45, 53, 55, 56 and 57 are not necessary for the delivery of the message but optional features that may be used to improve the operation.

Thus, when a message delivery over a primary messaging service fails, the primary messaging service notifies the sending user equipment of the failure and optionally requests the sending user equipment to send the message via another messaging service. The sending user equipment acts accordingly, and the message will be delivered without worrying the user A and without the primary messaging service provider having to bear the cost of the back-up delivery. The cost of using the back-up messaging service will be beared by the user A, since the message is sent directly from user's device instead of the primary messaging service center. If the primary messaging service center sent the message via the back-up messaging service, the cost of using the back-up messaging service would be beared by the primary messaging service provider. This cost can be extremely high, for example in the case the primary service provider is an Internet service provider, such as Twitter (twitter.com), the cost of SMS delivery as a back-up can be very high for the service provider. Moreover, in order to use the back-up messaging service, the primary messaging service should have the address of the recipient user B for the back-up service, e.g. the SMS address. In the sending user equipment the different addresses of the recipient user B are often readily available, e.g. the contact/phone book application, and the different addresses can be easily mapped in the user equipment. Moreover, the user is usually aware of the cost of different services and thereby can select the least cost back-up service. In an embodiment of the invention, the failure of delivering the primary message and the possibility of resending the message over the back-up messaging service(s) are presented to the user, and the user may select through a user interface whether and over which messaging service the message is resent. In another embodiment, the user equipment performs the resending automatically without intervention of the user, when it receives the notification of failed delivery over the primary messaging service. The user equipment may, however, notify the user of the resending. The user may have predefined which messaging service(s) will be used in the automated resending. In an embodiment of the invention, the format of the message sent over the back-up messaging service from the user equipment may be similar to the format of a message that would have been sent directly from the primary messaging service center. For example, advertisements may be present also in the message sent from the user device. In an embodiment of the invention, the notification of the failure from the primary messaging service center may contain the additional material, such as the advertisement to be inserted into the message, or the notification may contain all content of the message to be sent over the back-up messaging service.

As noted above, Session Initiation Protocol (SIP) is a text-based protocol that may be used for establishing, modifying, and terminating multimedia sessions. With SIP it is possible to invite new participants to the existing sessions and modify the media of the existing session. There are two types of SIP messages: Requests and Responses. They share a common format. Basically SIP message may contain three parts: a start-line, message headers and an optional message-body. The communication between the user equipment UE1 and the primary messaging service center (e.g. server) in FIG. 2 may be as follows, for example. The protocol used may be SIP or any other suitable protocol.

The message sent in step 21 may be:
MESSAGE sip:user2@domain.com SIP/2.0
From: sip:user1@domain.com
To: sip:user2@domain.com
Call-ID: asd88asd77a@1.2.3.4
CSeq: 1 MESSAGE
Content-Type: text/plain
Content-Length: 18
Watson, come here.

At step 22, the message sent from the primary messaging service center to the UE1 may be a query to send the message using another messaging service. The query may contain the original message as well as an added advertisement:
SIP/2.0 310 Use backup service
From: sip:user1@domain.com
To: sip:user2@domain.com
Call-ID: asd88asd77a@1.2.3.4
CSeq: 1 MESSAGE
Content-Type: text/plain
Content-Length: 47
Backup-Service-Gateway: backup.domain.com;id=23452
Watson, come here.
Books for sale at amazon.com Alternatively, the message body may be left out or modified, or only the advertisement may be included. If the message body is left out, an indication, e.g. a message identifier, may be included to identify the message which should be resent.

At step 25, the UE1 may notify the primary messaging service center that the message was delivered using the back-up service:
NOTIFY sip:backup.domain.com SIP/2.0
From: sip:user1@domain.com
To: sip:backup@domain.com
CSeq: 1 NOTIFY
Backup-Service-Gateway-Transaction: 23452

The primary messaging service center may acknowledge that the offline message is deleted from the queue:
SIP/2.0 200 OK
From: sip:user1@domain.com
To: sip:backup@domain.com
CSeq: 1 NOTIFY
Backup-Service-Gateway-Transaction: 23452

Figure 3:
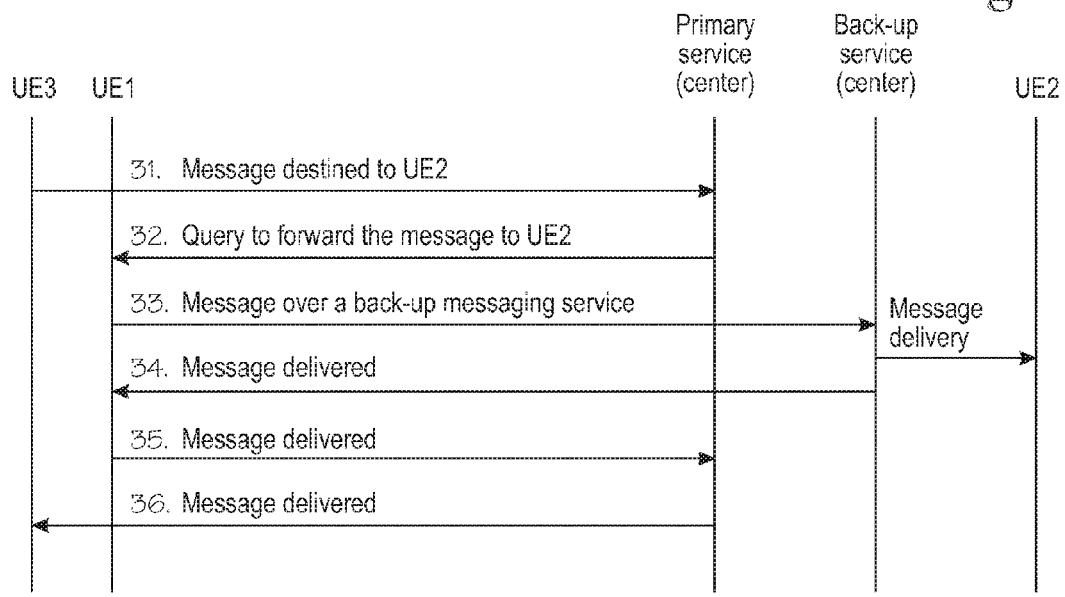
FIG. 3 is a messaging diagram illustrating an exemplary messaging event according to another embodiment of the invention.

Another aspect of the invention is now described by means of an exemplary messaging event with reference to FIGS. 3, 6 and 7. User equipment UE1 of user A is capable of using two or more messaging services, one of them being the preferred or primary service, e.g. because it is the least cost channel to deliver messages. The primary messaging service may be, for example, IP or SIP based messaging service. At least one other messaging service, such as SMS/MMS may be used as a back-up messaging service or channel. UE1 may contain a unified messaging client. At step 31, the primary messaging service center (e.g. server) receives from originating user equipment, such as UE3, a message 31 destined to recipient user equipment, e.g. UE2, via the primary messaging service (step 61). In a conventional case, the primary messaging service center would attempt to deliver the message directly to the UE2, and if the delivery failed, the message would be stored and delivered offline. However, in this example embodiment of the invention, instead of delivering the message directly to the UE2 (the "yes" branch from step 62), the primary messaging service center may decide to use another (back-up) delivery channel (the "no" branch from step 62) due to a failure to deliver the message directly, for example, or because the delivery is less costly through the other delivery channel. The primary messaging service center may decide to send the message to the user equipment UE1 with a query 32 to send it further to the original recipient UE2 over the back-up messaging service (step 63). Upon receiving the query message 32 (step 71), the UE1 may, automatically or upon being triggered by the user, send/forward/relay the message 33 to the UE2 using the back-up messaging service (step 72). The message may be received at a back-up messaging service center (e.g. an SMS/MMS service center) and the backup service center successfully delivers the message to the UE2. The backup service center may then send an acknowledgement message 34 informing the UE1 of the successful delivery. Upon receiving the message 34 (step 73), UE1 may then send to the primary service a message 35 indicating that the message has been successfully delivered using the back-up messaging service (step 74). Upon receiving the notification 35, the primary messaging service center may inform 36 the UE3 that the message has been delivered (step 65). The primary messaging service center may also delete the stored message from an offline queue, i.e. the offline delivery is discarded. It should be appreciated that the steps illustrated above are merely examples. Particularly messages 34, 35 and 36, and steps 64, 65, 73 and 74 are not necessary for the delivery of the message but optional features that may be used to improve the operation. The messages sent at steps 32 and 35 may be similar to those described above with respect to steps 22 and 25, for example.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

User equipment may refer to any user communication device. A term "user equipment" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal having S60 operating system from Nokia Corporation. Thus, the application capabilities of the device according to various embodiments of the invention may include native S60 applications available in the terminal, or subsequently installed applications. The messaging service center may be implemented in any network element, such as a server.

Reference is now made to FIG. 8, which illustrates an exemplary block diagram of an entity 80 capable of performing operation according to various embodiments of the invention, such as the primary messaging service server or the user equipment. The entity 80 may generally include a processor, controller, or the like 82 connected to memory 84. The memory 84 may include volatile and/or non-volatile memory and typically stores content, data, or the like. For example, the memory 84 may store computer program code such as software applications or operating systems, information, data, content, or the like for the processor 82 to perform steps associated with operation of the entity in accordance with embodiments of the present invention. Also, for example, the memory 84 typically stores content transmitted from, or received by, the entity 80. Memory 84 may be, for example, random access memory (RAM), a hard drive, or other fixed data memory or storage device. The processor 82 may receive input from an input device 83 and may display information on a display 81. The processor 82 can also be connected to at least one communication interface 85 or other means for transmitting and/or receiving data, content, messages, or the like. Where the entity 80 provides wireless communication, such as in a UMTS, GSM, EDGE, WCDMA network, Bluetooth network, a wireless LAN network, or other mobile network, the processor 82 may operate with a wireless communication subsystem of the interface 85. Where the entity 80 provides an IP server with IP communication, the processor 82 may operate with an IP communication system of the interface 85. One or more processors, memory, storage devices, and other computer elements may be used in common by a computer system and subsystems, as part of the same platform, or processors may be distributed between a computer system and subsystems, as parts of multiple platforms. If the entity 80 is, for example, a mobile station or a network server, the entity 80 may also include modules such as a messaging service client/server and/or an application associated with the processor 82. These modules may be software and/or software-hardware components. For example, a messaging service client/server may include software capable of establishing, modifying, and terminating messaging sessions, to send and receive messages, etc. An application block may include, for example, a phone or contact book application in user equipment.

It will be obvious to a person skilled in the art that, as the technology advances, the inventive concept can be implemented in various ways. The invention and its embodiments are not limited to the examples described above but may vary within the scope of the claims.

We claim:

1. A method, comprising: sending, at a user device, a message addressed to a recipient user device via a first messaging service element; receiving, at said user device, from a messaging system, a notification of failure to deliver the message to the recipient user device; sending, at said user device, said message to the recipient user device via a backup messaging service element based on said notification of failure; and sending, at said user device, a message indicating the failed message need not be delivered offline and has been delivered by another messaging service element, wherein said notification of failure comprises a query from the first messaging service element for said message to be sent via the backup messaging service element when the recipient user device is unavailable, wherein said message sent via the backup messaging service element is a message modified by the first messaging service element, wherein the first message service element does not comprise the backup messaging service element and vice versa, and wherein the modified message comprises a message identifier to identify the message to be resent.

2. A method as claimed in claim 1, comprising sending said message to the recipient user device via the backup messaging service element or optionally, when the first messaging service element is not reachable, by the user device.

3. A method as claimed in claim 1, comprising:
sending, at said user device, to the messaging system, a notification of delivery of said message via said backup messaging service element.

4. A method as claimed in claim 1, comprising:
selecting a least-cost messaging service as said first messaging service element.

5. A method as claimed in claim 1, comprising:
selecting, at said user device, the backup messaging service element and a backup address based on user contact information stored in said user device.

6. A method as claimed in claim 1, wherein said first messaging service element comprises an Internet Protocol based messaging service, and wherein said backup messaging service element comprises a text message service or a multimedia messaging service over mobile communication media.

7. A method, comprising: receiving, at a messaging service element, from an originating user device, a message addressed to a recipient user device via a first messaging service element; sending, at said messaging service element, to said originating user device, a notification of failure to deliver the message to the recipient user device; storing said message at said messaging service element; receiving, at said messaging service element, from said originating user device, a notification of delivery of said message directly from said originating user device via a backup messaging service element based on said notification of delivery; receiving, at said messaging service element, a message indicating the failed message need not be delivered offline and has been delivered by another messaging service element; deleting the stored message in response to receiving said notification of delivery; and modifying, at said messaging service element, said message before delivering it using the backup messaging service element, wherein said notification of failure comprises a query from the first messaging service element for said message to be sent via the backup messaging service element when the recipient user device is unavailable, wherein the first message service element does not comprise the backup messaging service element and vice versa, and wherein the modified message comprises a message identifier to identify the message to be resent.

8. A method as claimed in claim 7, wherein said first messaging service element comprises an Internet Protocol based messaging service, and wherein said backup messaging service element comprises a text message service or a multimedia messaging service over mobile communication media.

9. A user device, comprising: a first messaging service element configured to send a message addressed to a recipient user device; a messaging system configured to receive a notification of failure to deliver the message to the recipient user device, wherein the messaging system is configured to send a message indicating the failed message need not be delivered offline and has been delivered by another messaging service element; and a backup messaging service element configured to send said message to the recipient user device based on said notification of failure, wherein said notification of failure comprises a query from the first messaging service element for said message to be sent via the backup messaging service element when the recipient user device is unavailable, wherein said message sent via the backup messaging service element is a message modified by the first messaging service element, wherein the first message service element does not comprise the backup messaging service element and vice versa, and wherein the modified message comprises a message identifier to identify the message to be resent.

10. A user device as claimed in claim 9, wherein the user device is configured to send said message to the recipient user device via the backup messaging service element optionally, when the first messaging service element is not reachable.

11. A user device as claimed in claim 9, wherein the user device is configured to select the backup messaging service element and a backup address based on user contact information stored in said user device.

12. A messaging service network element, comprising: a first messaging service element configured to receive a message addressed to a recipient user device from an originating user device; a messaging service element configured to send to said originating user device, a notification of failure to deliver the message to the recipient user device, wherein the messaging service element is configured to receive a message indicating the failed message need not be delivered offline and has been delivered by another messaging service element, wherein the messaging service element is configured to store said message; and a backup messaging service element configured to receive from said originating user device, a notification of delivery of said message directly from said originating user device based on said notification of delivery, wherein the messaging service element is configured to delete the stored message in response to receiving said notification of delivery, wherein said notification of failure comprises a query from the first messaging service element for said message to be sent via the backup messaging service element when the recipient user device is unavailable, wherein said message sent via the backup messaging service element is a message modified by the first messaging service element, wherein the first message service element does not comprise the backup messaging service element and vice versa, and wherein the modified message comprises a message identifier to identify the message to be resent.

13. A user device, comprising: a control unit and a memory, the memory containing an executable code which, when executed in the control unit, causes the user device to perform routines of sending via a first messaging service element, a message addressed to a recipient user device; receiving from a messaging system a notification of failure to deliver the message to the recipient user device; sending via a backup messaging service element said message to the recipient user device based on said notification of failure; and sending a message indicating the failed message need not be delivered offline and has been delivered by another messaging service element, wherein said notification of failure comprises a query from the first messaging service element for said message to be sent via the backup messaging service element when the recipient user device is unavailable, wherein said message sent via the backup messaging service element is a message modified by the first messaging service element wherein the first message service element does not comprise the backup messaging service element and vice versa, and wherein the modified message comprises a message identifier to identify the message to be resent.

14. A computing device, comprising: a memory which contains an executable code which, when executed by the computing device, causes the device to perform routines of receiving from an originating user device, a message addressed to a recipient user device via a first messaging service element; sending to said originating user device, a notification of failure to deliver the message to the recipient user device; storing said message; receiving from said originating user device, a notification of delivery of said message directly from said originating user device via a backup messaging service element based on said notification of delivery; receiving from said originating user device, a message indicating the failed message need not be delivered offline and has been delivered by another messaging service element; and deleting the stored message in response to receiving said notification of delivery, wherein said notification of failure comprises a query from the first messaging service element for said message to be sent via the backup messaging service element when the recipient user device is unavailable, wherein said message sent via the backup messaging service element is a message modified by the first messaging service element, wherein the first message service element does not comprise the backup messaging service element and vice versa, and wherein the modified message comprises a message identifier to identify the message to be resent.

15. A method as claimed in claim 1, further comprising:
receiving, at said user device, from the messaging system, a query whether to forward the message to the recipient user device via the backup messaging service element.

16. A method as claimed in claim 7, further comprising:
  receiving, at said messaging service element, from the messaging system, a query whether to forward the message to the recipient user device via the backup messaging service element.

\* \* \* \* \*